(12) United States Patent
Barnes

(10) Patent No.: US 7,506,909 B2
(45) Date of Patent: Mar. 24, 2009

(54) EXPANDABLE TRUCK BED

(76) Inventor: Wilbert E. Barnes, 7144 Oak Side Dr., Montgomery, AL (US) 36117

( * ) Notice: Subject to any disclaimer, the term of this patent is extended or adjusted under 35 U.S.C. 154(b) by 47 days.

(21) Appl. No.: 11/684,069

(22) Filed: Mar. 9, 2007

(65) Prior Publication Data

US 2008/0217945 A1 Sep. 11, 2008

(51) Int. Cl.
*B60P 3/34* (2006.01)
(52) U.S. Cl. .................. 296/26.13; 296/26.12
(58) Field of Classification Search ............ 296/26.12, 296/26.13, 183.1, 186.4, 26.08, 26.11, 26.1, 296/26.04, 26.02, 26.01, 26.03
See application file for complete search history.

(56) References Cited

U.S. PATENT DOCUMENTS

| | | | | |
|---|---|---|---|---|
| 1,419,475 A | * | 6/1922 | Smith | 296/26.13 |
| 3,010,760 A | * | 11/1961 | Trautmann | 296/57.1 |
| 3,245,714 A | * | 4/1966 | Blair | 296/26.13 |
| 4,342,146 A | * | 8/1982 | Hanson | 296/26.12 |
| 4,480,866 A | * | 11/1984 | Komatsu | 296/21 |
| 4,580,828 A | * | 4/1986 | Jones | 296/57.1 |
| 4,695,087 A | * | 9/1987 | Hollrock | 296/26.02 |
| 4,772,038 A | * | 9/1988 | MacDonald | 280/401 |
| 5,456,511 A | * | 10/1995 | Webber | 296/26.09 |
| 5,669,654 A | * | 9/1997 | Eilers et al. | 296/26.11 |
| 5,702,142 A | * | 12/1997 | Newell | 296/19 |
| 5,758,918 A | * | 6/1998 | Schneider et al. | 296/26.13 |
| 5,938,262 A | | 8/1999 | Mills | |
| 6,367,858 B1 | | 4/2002 | Bradford | |
| 6,644,708 B1 | * | 11/2003 | Grzegorzewski et al. | 296/26.15 |
| 6,886,877 B1 | * | 5/2005 | Plavetich et al. | 296/57.1 |
| 6,969,105 B2 | * | 11/2005 | Rincoe | 296/26.13 |
| 7,055,879 B2 | * | 6/2006 | De Gaillard | 296/26.08 |
| 7,059,666 B2 | * | 6/2006 | Harrison | 296/26.15 |
| 7,073,816 B1 | * | 7/2006 | Larson et al. | 296/26.12 |
| 7,264,292 B1 | * | 9/2007 | Summers | 296/26.11 |
| 2004/0160074 A1 | * | 8/2004 | Shea | 296/26.13 |
| 2004/0256873 A1 | * | 12/2004 | McManus et al. | 296/26.01 |
| 2005/0093339 A1 | * | 5/2005 | Klassen | 296/183.1 |
| 2005/0168004 A1 | * | 8/2005 | Vandewinckel et al. | 296/26.12 |
| 2005/0189777 A1 | * | 9/2005 | Rasmussen | 296/26.01 |

\* cited by examiner

*Primary Examiner*—Kiran B. Patel
(74) *Attorney, Agent, or Firm*—Invention Protection Associates, LLC

(57) ABSTRACT

A truck bed assembly within which the width dimension of the bed's cargo space can be selectively adjusted, the assembly including laterally movable sidewalls that are constructed so as to widen the bed floor surface as they are moved outward as well as a laterally expandable tailgate that lengthens and shortens as the sidewalls are laterally expanded and retracted.

12 Claims, 5 Drawing Sheets

EXPANDABLE TRUCK BED

BACKGROUND OF THE INVENTION

The present invention generally relates to an expandable truck bed, and it specifically relates to a truck bed assembly in which the bed sidewalls may be moved laterally outward, to increase bed carrying capacity, while retaining their vertical posture.

Pickup trucks are characterized by having cargo beds configured to carry items that could not be fitted inside the passenger compartments of most other vehicles, or that would risk damaging upholstery if placed within the passenger cabin. Typically, a truck bed will comprise a rectangular floor, a front wall joined to the frontward end of the floor, a pair of opposing sidewalls joined to the side ends of the floor and a tailgate hinged to the rearward end of the floor. Conventional tailgates are downwardly openable to permit cargo to be loaded onto and unloaded from the bed without having to lift the cargo over an upright tailgate or the sidewalls. However, sometimes the dimensions of cargo to be placed onto a truck are such that that truck's bed simply cannot accommodate the cargo without somehow enlarging the cargo carrying space.

Consequently, adjustable truck bed assemblies and bed add-on devices have been developed in the prior art. Some of these truck bed assemblies are length-adjustable. For example, U.S. Pat. No. 6,367,858 to Bradford discloses a truck bed extension assembly featuring slide panels that can be slid between a closed position in which the panels are entirely disposed within the bed sidewalls and an open position in which the panels are extended out from within the sidewalls to effectively lengthen the bed. This assembly also includes a second tailgate that provides bed closure when the first tailgate is open and the slide panels are extended the length of the horizontal lying first tailgate. As another example, U.S. Pat. No 5,938,262 to Mills discloses a truck bed assembly which includes a horizontal plate that is slidable relative to the bed floor by way of a rail and roller assembly which operatively connects the plate and the floor. When the truck's tailgate is open, the plate can be slid rearward and locked into position to provide an elongated bed floor. The prior art is also replete with various truck bed attachment devices that can be affixed to the end of the bed to provide rear closure for a longitudinally expanded cargo space when the tailgate is open.

Additionally, there is a plethora of prior art truck bed assemblies in which the bed carrying capacity can be effectively expanded laterally. For instance, U.S. Pat. No. 7,059,666 to Harrison teaches a cargo bed in which the sidewalls are pivotally connected to the bed floor such that they can be selectively moved between vertical closed positions and horizontal open positions. U.S. Pat. No. 6,644,708 to Grzegorzewski et al. discloses an operatively similar assembly in which the sidewalls can be laid down. However, a common aesthetic, if not functional, disadvantage of the width-adjustable prior art truck beds of which the present inventor is aware is that, when laterally expanded, they either convert to flatbed configurations that lack side retaining walls, or they require erection of secondary sidewalls or sidewall attachments that adversely affect the truck's appearance.

Therefore, there exists a need for a truck bed that can be expanded widthwise to increase its cargo capacity, but that substantially maintains its appearance and retaining structure throughout expansion. The present invention substantially fulfills this need.

SUMMARY

The present invention is directed to a truck bed which can be selectively expanded widthwise to increase its cargo carrying capacity in a manner that does not alter the vertical disposition of the bed sidewalls. A minimal embodiment of the inventive truck bed comprises: a bed floor; a front wall coupled perpendicularly to the frontward end of the floor; sidewalls which are substantially perpendicular to the floor and which span the length of the floor; a tailgate pivotally attached to the rearward end of the floor; and at least one slide mechanism which connect the sidewalls to the bed floor and permit the sidewalls to expand and contract laterally. Preferably, the truck bed further includes at least a pair of vertically oriented hydraulic jacks which move the sidewalls between a retracted position in which they are spaced from one another by the width of the bed floor panel to an expanded position in which they are spaced further apart; and a user controller for allowing push button actuation of the jacks.

Therefore, it is an object of the present invention to provide a truck bed that is capable of being adapted to accommodate larger cargo.

It is another object of the invention to allow for lateral expansion of the bed capacity without requiring that the bed sidewalls be folded down or otherwise manipulated such that they cease providing side retention when the sidewalls are laterally expanded. Accordingly, it is also an object of the invention to allow the bed to substantially maintain its appearance when expanded.

It is a further object of the present invention to provide for powered lateral expansion and retraction of the truck bed. By incorporating remotely controlled hydraulic jacks or electric motors that drive the bed sidewalls, a user can effortlessly adjust the bed size as needed.

DETAILED DESCRIPTION OF THE PREFERRED EMBODIMENTS

A preferred embodiment of the expandable truck bed of the present invention employs several integrated elements including: a bed floor 140, a front wall 120, left and right sidewalls 110 and a rear tailgate 130.

Figure 3:
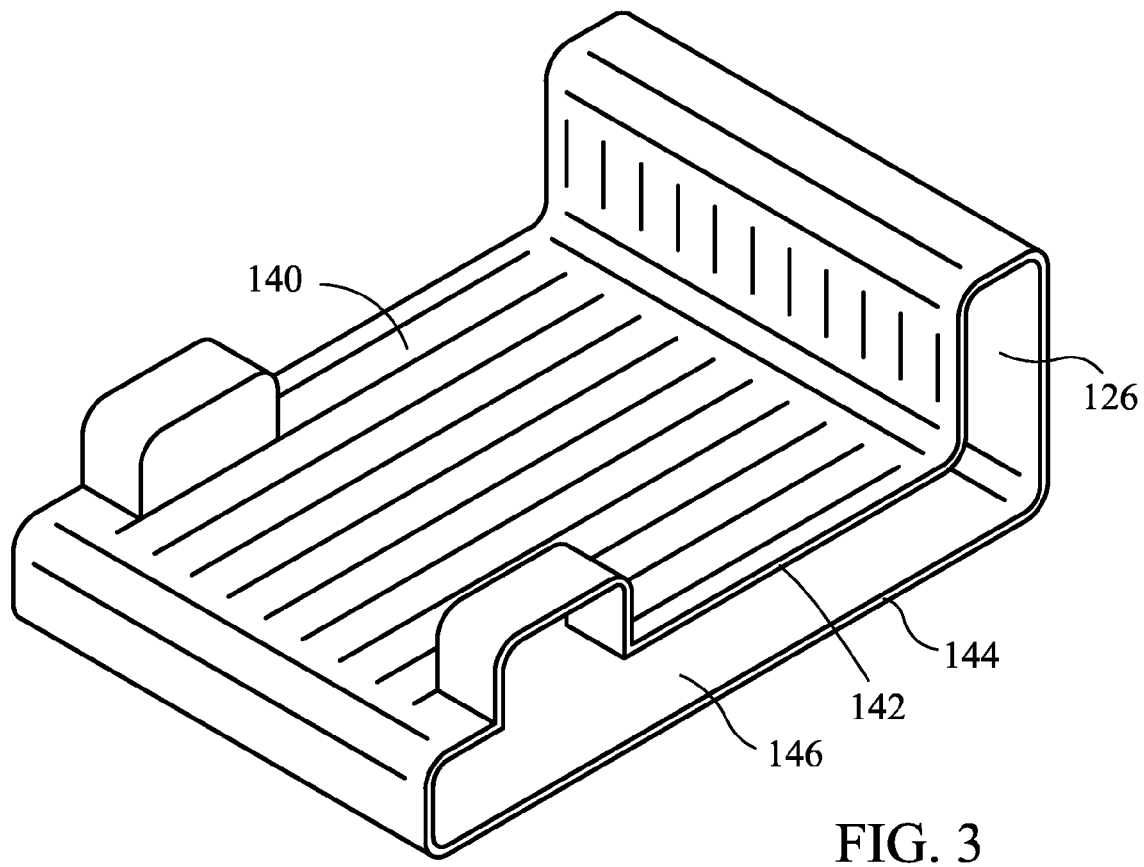
FIG. 3 is a top and right perspective view of the floor panel of the bed, shown in isolation.
Figure 6:
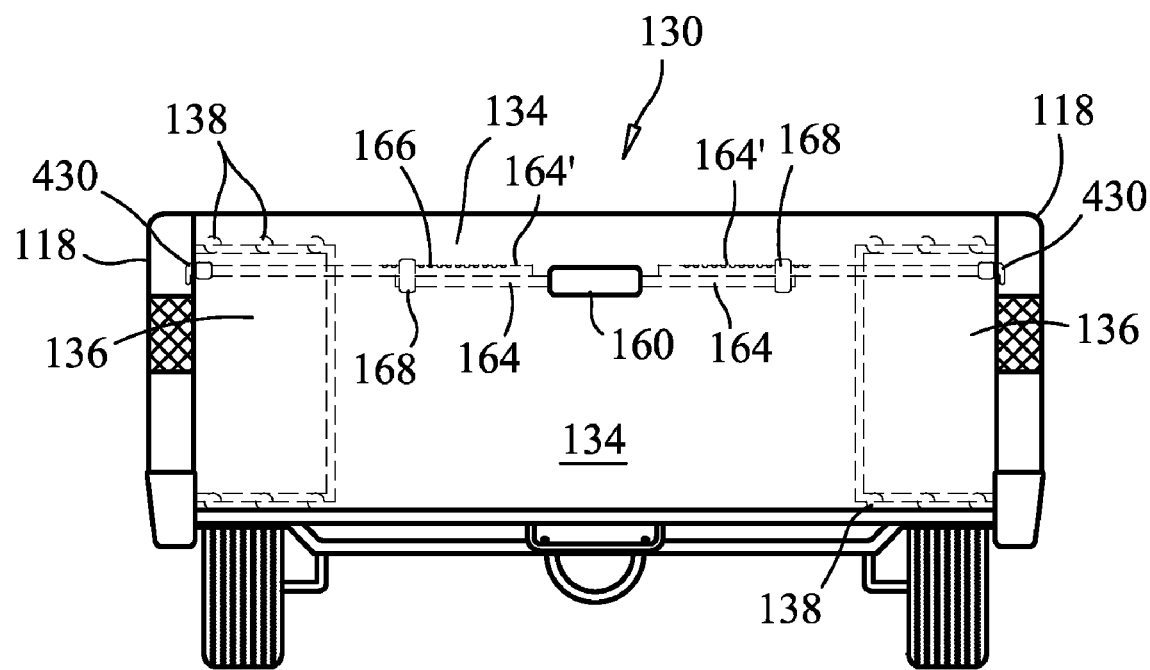
FIG. 6 is a rear and elevational view of the tailgate of the present invention. In this view, the tailgate is in a retracted state.

As shown in FIG. 3, the front wall 120 is a hollow steel panel with open left and right ends 126. It is vertically positioned adjacent the truck cabin 10. Secured to the bottom of the front wall 120 is the bed floor 140. The bed floor 140 is a generally horizontal, hollow steel panel formed by a top sheet 142 that directly supports cargo and a bottom sheet 144, both of which are joined by a bend at their longitudinal rearward ends such that openings 146 remain along the left and right sides of the floor panel 140. The top 142 and bottom 144 sheets of the floor panel are secured to the bottoms of counterpart metal sheets of the front wall panel 120 to form continuous space within the perpendicularly joined floor 140 and front wall 120. Finally, the tailgate 130 is comprised of two extension panels 136 retractably disposed within a hollow central panel 134 as illustrated in FIG. 6. The tailgate 130 is hinged to the rearward end of the bed floor 140 and may be pivoted 90 degrees between an open horizontal position and a closed vertical position. As with conventional tailgates and as will be discussed later, the present tailgate 130 releasably engages the sidewalls 110.

Figure 1:
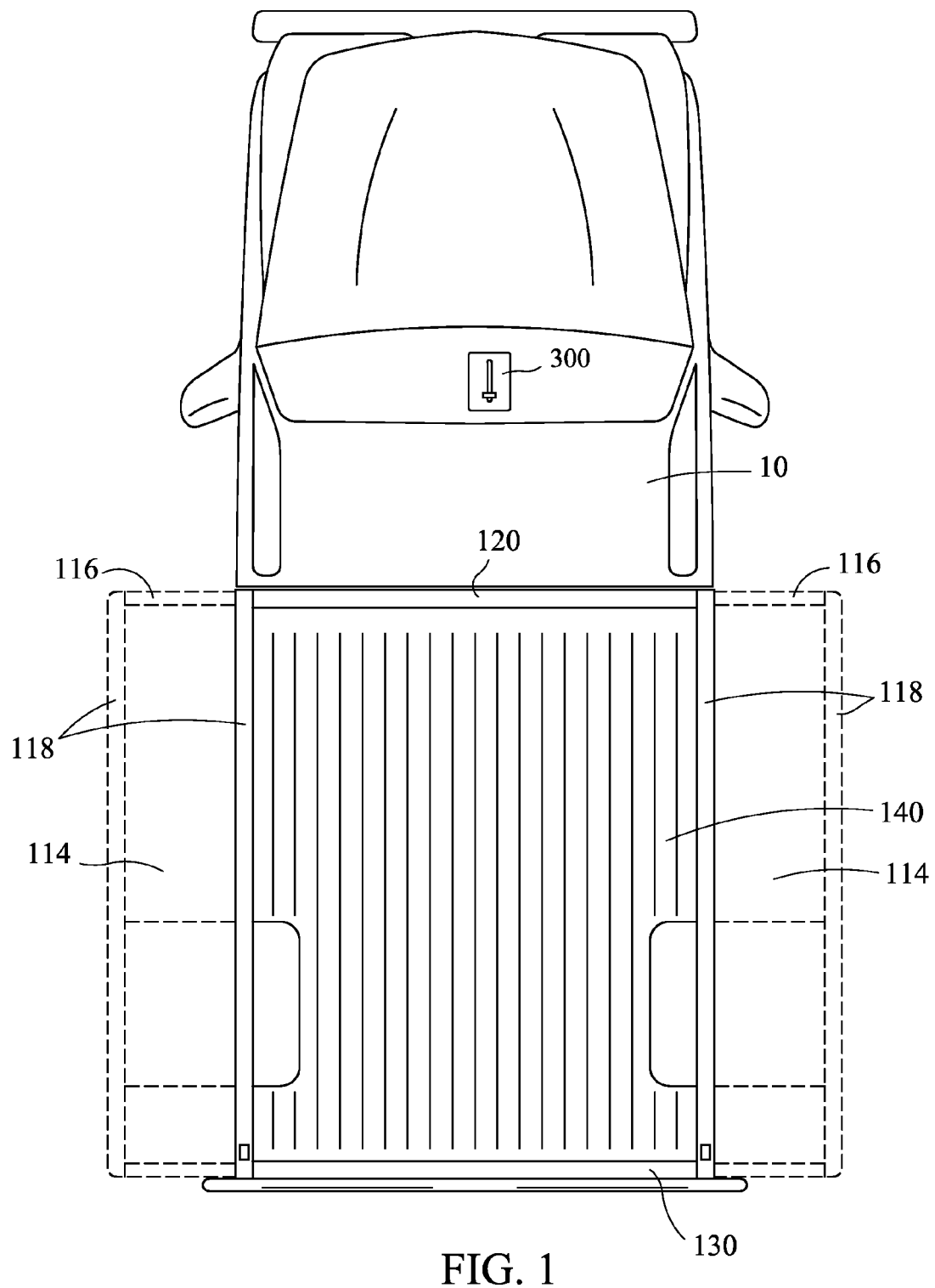
FIG. 1 is a top plan view of a pickup truck that is equipped with the expandable truck bed of the present invention. In this view, lateral expandability of the bed sidewalls is demonstrated with phantom lines.
Figure 2:
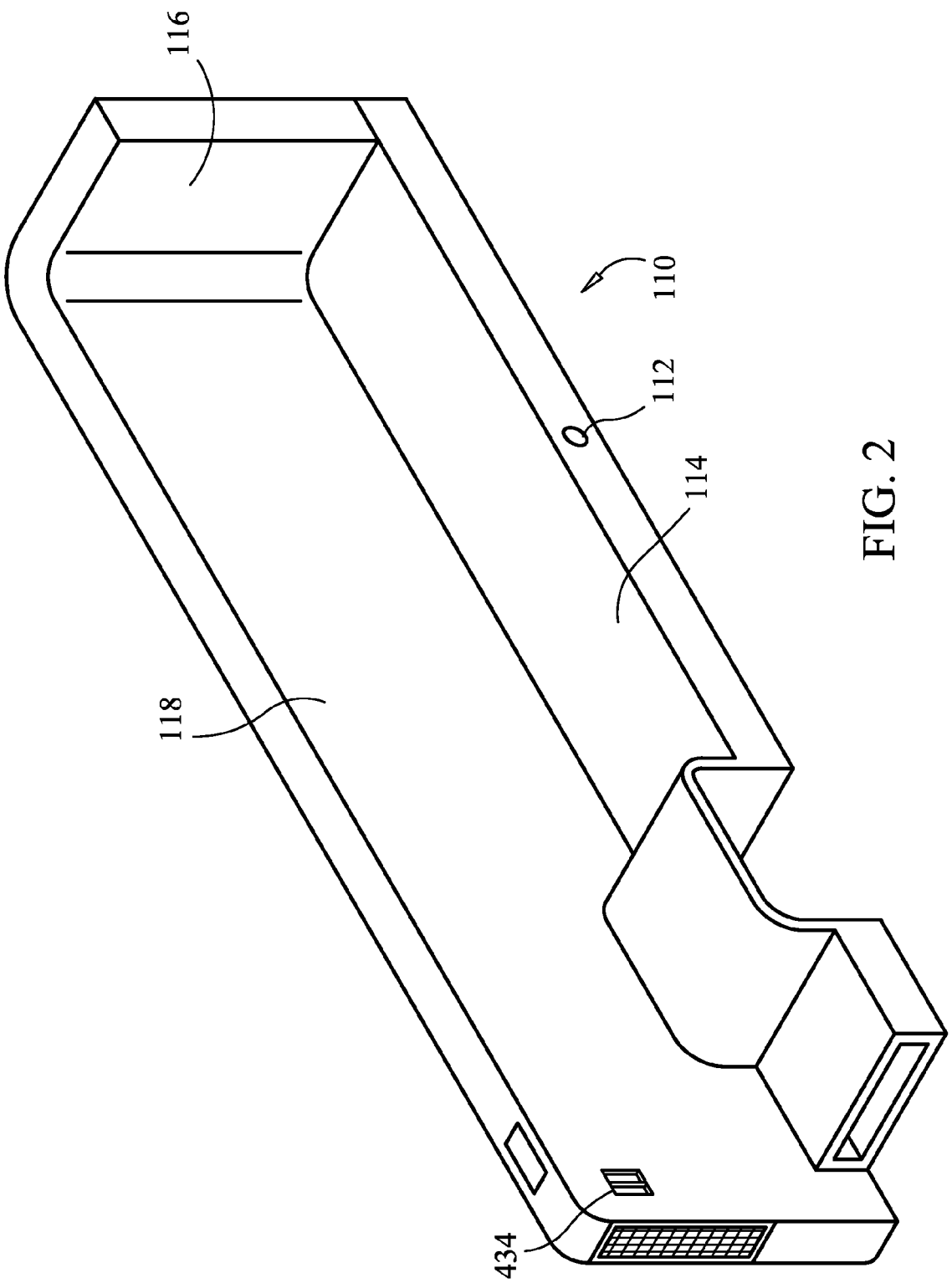
FIG. 2 is a top and right perspective view of the left sidewall of the bed, shown in isolation.

From viewing FIG. 2, it can be understood that each sidewall 110 is a single unit comprising the following three distinct sections: (1) a side retaining wall 118 which is vertically disposed and functions as a traditional truck bed sidewall; (2) a front extension 116 which is vertically disposed, perpendicularly meets the frontward end of the side retaining wall 118 and inserts into an end opening 126 within the front wall 120; and (3) a floor extension 114 which is horizontally disposed, perpendicularly meets the side retaining wall 118 and inserts into a lateral side opening 146 within the floor 140. Therefore, when the two sidewalls 110 are fully contracted, their front extensions 116 and their floor extensions 114 are fully enveloped by the front wall 120 and bed floor 140, respectively, such that the opposing side retaining walls 118, the front wall 120, the tailgate 130 and the floor 140 define the truck bed enclosure. As the sidewalls 110 are laterally extended, their respective front extension portions 116 slide out from within the front wall 120, and their floor extension portions 114 emerge from within the bed floor 140. Thus, when the bed enclosure is extended, both the bed floor part 140 and the sidewall floor extensions 114 provide cargo floor support, while the front wall 120 and sidewall front extensions 116 jointly provide frontal retention.

A plethora of linear motion systems, both manual and automated, could conceivably be used to facilitate lateral sidewall movement. Nevertheless, a couple of suitable alternative slide mechanisms are illustrated and described herein. One is a motor driven mechanism and the other, and preferred, mechanism is hydraulically driven. Nevertheless, both such slide mechanisms incorporate two identical, synchronously actuated subassemblies which each operate on one sidewall 110 to achieve inward and outward lateral movement of the sidewalls 110. For simplicity, the configuration of merely one subassembly of each alternative slide mechanism will be described in succession immediately following. However, it should be again emphasized that still other mechanisms for facilitating lateral movement of the sidewall elements could be employed without departing from the present overall inventive concept.

Figure 4:
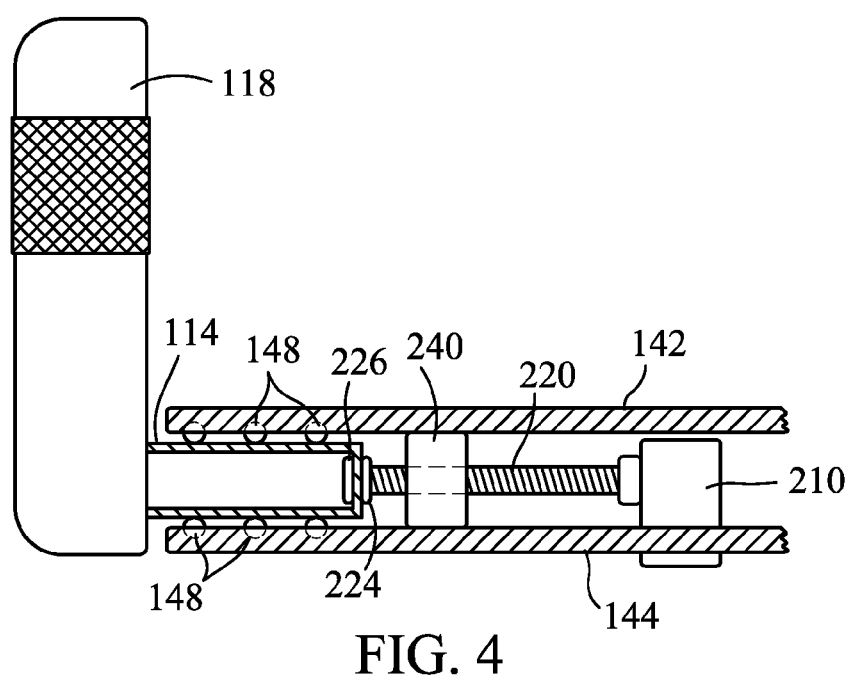
FIG. 4 is a rear and elevational view of an alternative embodiment of a slide mechanism for the present invention—an embodiment in which linear movement of a sidewall is motor driven. In this view, the bed floor and the floor extension portion of the left sidewall are shown in cross-section.

As shown in FIG. 4, embedded within the bed floor's top and bottom sheets 142, 144 are arrangements of rollers 148 that are in contact with the sidewall floor extension 114. These rollers 148 permit the floor extension 114 to slide laterally within the floor panel 140 while encountering minimal friction. Also sandwiched within the floor panel 140—inward of the sidewall extension 114—is a nut 240 having a threaded bore. The nut 240 is affixed to the floor panel sheets 142, 144 to prevent it from sliding or rotating. Finally, in threaded engagement with the nut 240 is a screw-threaded shaft 220 that is rotated by an electric drive motor 210. From the motor 220, the shaft 220 projects laterally outward through the fixed nut 240 and then through a hole 112 within the sidewall floor extension 114. Coupling the shaft 220 to the floor extension 114 are a pair of circular flanges 226, 224 that are shortly spaced apart along the shaft 220 about opposite sides of the hole 114.

As the drive motor 210 rotates the shaft 220 clockwise, threaded engagement of the shaft 220 and fixed nut 240 causes the rotating shaft 220 to advance linearly outward through the nut 240. In turn, the shaft's inner flange 224 pushes against the abutting metal of the sidewall extension 114 and, aided by the bed floor rollers 148, the sidewall 110 slides laterally outward to expand the width of the cargo bed. Conversely, when the shaft 220 is rotated counterclockwise, the shaft 220 is drawn inward through the nut 240, and the pressing force of the outer flange 226 pulls the sidewall extension 114 deeper within the bed floor 140 to retract the sidewall 110.

The electric motor 210 is selectively controlled by a user interface module 300 disposed within the cabin area of the vehicle. The user module 300 may be wired (not shown) to the motor 210 may operate it wirelessly. Regardless, the number of revolutions in which the motor 210 is permitted to rotate the attached shaft 220 in either rotational direction should be electronically limited so as to prevent the shaft 220 from advancing too far inward or outward and encountering undesirable resistance (caused by motor 210 running into the nut 240, for example).

Figure 5:
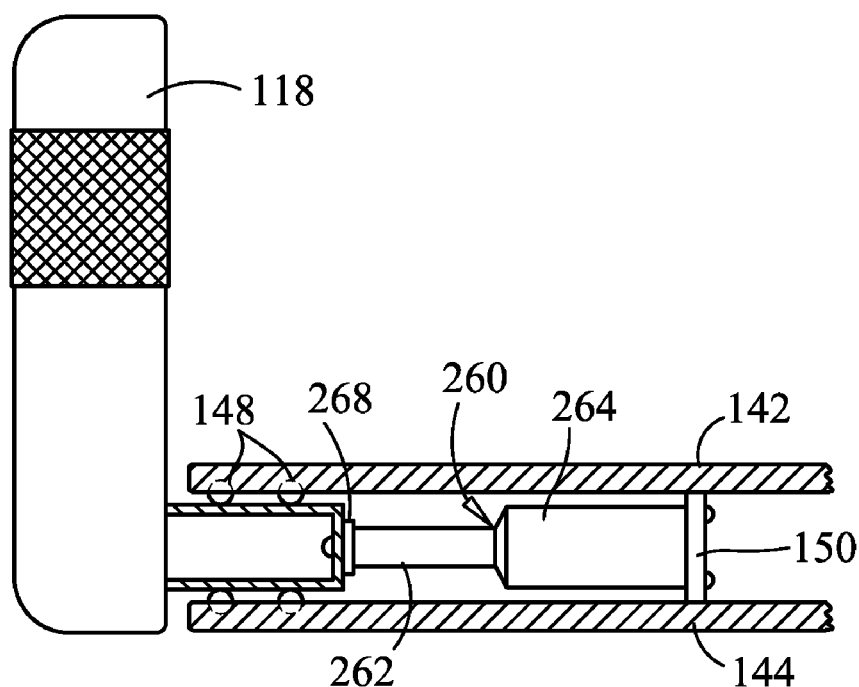
FIG. 5 is a rear and elevational view of a portion of the preferred embodiment of a slide mechanism for the present invention—an embodiment in which linear movement of a sidewall is hydraulically driven. In this view, the bed floor and the floor extension portion of the left sidewall are shown in cross-section.

However, because of the nut and shaft assembly's susceptibility to mechanical wear, it is preferable to push and pull the sidewalls 110 by way of hydraulic or pneumatic means. Therefore, the preferred embodiment of the present invention employs a hydraulic push/pull device or jack 260 as illustrated in FIG. 5. This horizontally disposed jack 260 comprises a cylindrical rod 262 in telescopic engagement with a larger diametered cylinder 264. The rod 262 is selectively extendable from and retractable into the cylinder 264 by conventional hydraulic operation. At one end of the jack 260, its rod 262 is coupled to the sidewall floor extension 114 via a bolted attachment plate 268 or other suitable securing means. At the jack's opposite end, its cylinder 264 is similarly secured to a vertical mounting wall 150 which resides within the bed floor panel 140.

Figure 8:
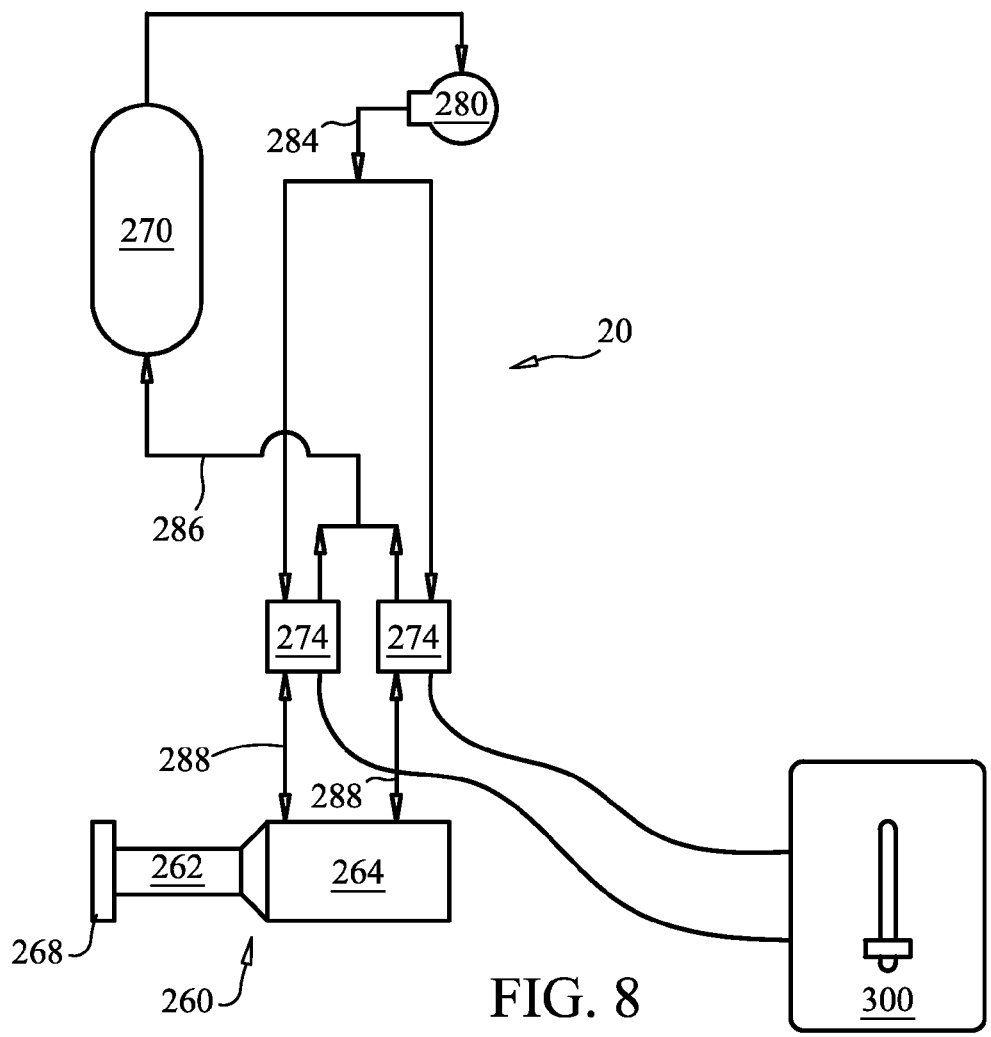
FIG. 8 is a diagrammatic illustration of the entire hydraulic slide mechanism.

FIG. 8 illustrates an example of an overall hydraulic system 20 used to operate the jack 260. In addition to the jack 260 itself, system components include a fluid reservoir 270, a pump 280 and a pair of solenoids 274 that are positioned about the vehicle as may be desired. The solenoids 274 are continually connected to the jack 260 via fluid lines 288.

However, they are selectively connected to either the pump 280 or the reservoir 270 directly. A pressure line 284 connects the solenoids 274 to the pump 280, while a drain line 286 connects the solenoids 274 directly to the reservoir 270. When a solenoid 274 connects to the pressure line 284, the pump 280 is able to deliver pressurized fluid through the pressure line 284 and then through a fluid line 288 to the jack 260. Conversely, when a solenoid is connected to the drain line 286, fluid exits the jack 260 through a fluid line 288 and then through the drain line 286, depositing into the reservoir 270.

When the rate of fluid flow into the jack 260 is greater than that exiting it, fluid pressure projects the rod 262 out of the cylinder 264 and, in turn, pushes the coupled sidewall 110 outward. Conversely, when the net fluid flow is out of the jack 260, the rod 262 withdraws back into the cylinder 264 and pulls the sidewall 110 inward. Solenoid connectivity, which dictates the balance of hydraulic fluid flow between the jack 260 and the reservoir 270 and thus effects extension and retraction of the jack 260, is selectively controlled through a user module 300 that is wired to the solenoids 274.

Figure 7:
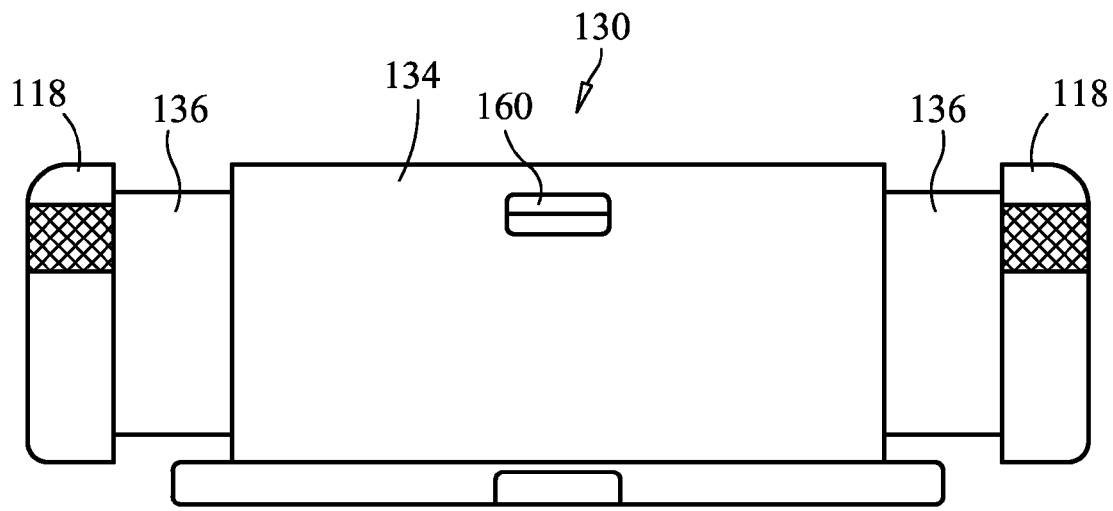
FIG. 7 is a rear and elevational view of the tailgate in an extended state.

Residing at the outer ends of the two tailgate extension panels 136 are spring loaded latches 430 which secure to corresponding posts within the side retaining walls 118 to maintain tailgate 130 closure. Furthermore, if the tailgate 130 is closed while the sidewalls 110 are being extended, engagement of the latches 430 and the side retaining walls 118 will cause the tailgate extension panels 136 to be pulled out from within the tailgate central panel 134. An extended tailgate 130 is illustrated in FIG. 7. Of course, the opposite effect occurs to the closed tailgate 130 as the sidewalls 100 are retracted. Therefore, without any manual manipulation of the tailgate 130 itself and without the use of any separate attachments, the truck bed's rear retaining wall automatically adjusts to correspond to the changing distance between the left and right side retaining walls 118. Sets of rollers 138 within the tailgate 130 allow its two extension panels 136 to slide back and forth against its central panel 134.

A handle 160 disposed on the tailgate central panel 134 is operatively linked to the left and right latches 430. More specifically, as shown in FIG. 6, parallel pairs of rods 164, 164' connect the handle 160 to each latch 430, and a clip 168 binds the two rods 164, 164' together. A first rod 164 is attached to the handle 160 and has the clip 168 rigidly affixed to it. A second rod 164' is attached to the latch 430, and it is slidable through the clip 168. The second rod 164' features successive stop grooves 166 along its length, and within the clip 168 is a retracting pin element (not shown) that projects into each groove 166. As the latch 430 advances inward or outward (by virtue of sidewall lateral movement), the second rod 164' progresses through the stationary clip 168. The force applied to the second rod 164' by a moving sidewall 110 will not allow the clip 168 to rest a stop groove 166 along the rod 164'. However, the magnitude of the pull force applied to the first rod 164 as the tailgate handle 160 is being pulled is insufficient to dislodge the clip 168 from a stop groove 166 at which the clip 168 is resting. Therefore, when the handle 420 is pulled while the tailgate 130 is closed, an opening force is transferred, via the clip 168, from the first rod 164 to the second rod 164' and is delivered to the latch 430. This opening force releases the latch 430 from the retaining wall 118 so that the tailgate 130 is free to pivot open.

It is understood that substitutions and equivalents for various elements set forth above may be obvious to those skilled in the art. Therefore, the full scope and definition of the present invention is to be set forth by the claims that follow.

What is claimed is:

1. A pickup truck bed comprising:
   a bed floor;
   sidewalls which are operatively connected to the bed floor, wherein the sidewalls are laterally movable between a retracted position and at least one expanded positions; and
   a laterally expandable tailgate connected to the rearward end of the bed floor, wherein the tailgate comprises a central body and left and right extending bodies that are slidably connected to the central body, wherein the extending bodies releasably engage the sidewalls so that, while the extending bodies and sidewalls are engaged, the extending bodies slide away from the central body as the sidewalls expand outward and slide toward the central body as the sidewalls retract inward.

2. The truck bed of claim 1, wherein said central body is a laterally elongate, hollow panel having rectangular recesses formed within its opposing lateral ends, wherein each end recess is defined by having horizontal top and bottom surfaces that are joined by a vertical inner side surface, wherein linear bearings are disposed along the top and bottom surfaces of each end recess and wherein each extending body is a rectangular, hollow panel in contact with the linear bearings such that the extending body telescopes within said central body.

3. The truck bed of claim 2, further comprising:
   a handle disposed along said central body;
   latching mechanisms disposed at the outer ends of said extending bodies, the latching mechanisms for releasably engaging said sidewalls;
   linking mechanisms that operatively connect the handle to the latching mechanisms;
   wherein said extending bodies are drawn outward from said central body end recesses as said sidewalls move outward toward an expanded position while the latching mechanisms and said sidewalls are engaged; and
   wherein said extending bodies are withdrawn into said central body end recesses as said sidewalls move inward toward the retracted position while the latching mechanisms and said sidewalls are engaged.

4. The truck bed of claim 1, wherein each sidewall comprises a vertically disposed wall portion and an extension portion that is perpendicular thereto, wherein the extension portion slidably engages the bed floor and wherein the retracted position is further defined by the extension portion and the bed floor being in substantially overlapping relation.

5. The truck bed of claim 2, further comprising a slide mechanism for allowing selective movement of said sidewalls between the retracted and expanded positions.

6. The truck bed of claim 5, wherein said slide mechanism comprises linear bearings which allow said sidewall extension portions to slide against said bed floor.

7. The truck bed of claim 5, wherein said slide mechanism comprises:
   a threaded shaft coupled to each sidewall;
   a fixed nut engaged to each shaft;
   means for rotating each shaft; and
   wherein rotating a shaft in one rotational direction causes the shaft to advance laterally outward through the nut and to move the sidewall to which the shaft is coupled toward the at least one expanded position, and rotating the shaft in the opposite rotational direction causes the shaft to advance laterally inward and move that sidewall toward the retracted position.

8. The truck bed of claim 7, wherein said shaft rotating means comprises a motor.

9. The truck bed of claim 8, further comprising a controller having a user interface, the controller for selectively operating said motor.

10. The truck bed of claim 5, wherein said slide mechanism comprises a push/pull device coupled to each sidewall, wherein the push/pull device can be expanded to push a sidewall outward toward the at least one expanded position, and it can be retracted to pull that sidewall inward toward the retracted position.

11. The truck bed of claim 10, wherein said push/pull device is hydraulically operated.

12. The truck bed of claim 10, wherein said slide mechanism further comprises a controller having a user interface, the controller for selectively expanding and retracting said push/pull device.

* * * * *